United States Patent
Jung et al.

(10) Patent No.: US 7,773,988 B2
(45) Date of Patent: Aug. 10, 2010

(54) NETWORK ENTRY METHOD IN WIRELESS MOBILE COMMUNICATION SYSTEM

(75) Inventors: Jae-Yong Jung, Suwon-si (KR); Young-Sik Ma, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 752 days.

(21) Appl. No.: 11/703,542

(22) Filed: Feb. 7, 2007

(65) Prior Publication Data
US 2007/0232305 A1   Oct. 4, 2007

(30) Foreign Application Priority Data
Feb. 7, 2006   (KR) .................. 10-2006-0011678

(51) Int. Cl.
*H04W 4/00* (2009.01)
(52) U.S. Cl. ............... 455/435.1; 455/436; 370/331; 370/332
(58) Field of Classification Search ............... 455/414.1, 455/414.2, 432.1, 433, 435.1, 436, 439, 450, 455/509, 513, 458, 411, 410; 370/329, 331, 370/335
See application file for complete search history.

(56) References Cited

U.S. PATENT DOCUMENTS

| 7,391,774 | B2* | 6/2008 | Lim et al. .................. 370/394 |
| 7,519,368 | B2 | 4/2009 | Lim et al. |
| 2003/0032389 | A1* | 2/2003 | Kim et al. .................. 455/3.01 |
| 2005/0208945 | A1 | 9/2005 | Hong et al. |
| 2006/0009241 | A1* | 1/2006 | Ryu et al. .................. 455/458 |
| 2006/0291414 | A1 | 12/2006 | Lim et al. |

FOREIGN PATENT DOCUMENTS

| KR | 10-2005-0088817 | 9/2005 |
| KR | 1020050109692 | 11/2005 |
| KR | 1020060085133 | 7/2006 |
| KR | 1020070001019 | 1/2007 |

* cited by examiner

*Primary Examiner*—Jean A Gelin
(74) *Attorney, Agent, or Firm*—The Farrell Law Firm, LLP

(57) ABSTRACT

A network entry method in a wireless mobile communication system is disclosed. An initial network entry method by a Mobile Station (MS) in a wireless mobile communication system includes sending a ranging request message including a Medium Access Control (MAC) address in a predetermined format to a Base Station (BS) and receiving a ranging response message including information associated with basic capability negotiation and information associated registration from the BS.

10 Claims, 4 Drawing Sheets

US 7,773,988 B2

NETWORK ENTRY METHOD IN WIRELESS MOBILE COMMUNICATION SYSTEM

PRIORITY

This application claims priority under 35 U.S.C. §119(a) to an application filed in the Korean Intellectual Property Office on Feb. 7, 2006 and assigned Serial No. 2006-11678, the entire disclosure of which is incorporated herein by reference.

BACKGROUND OF THE INVENTION

1. Field of the Invention

The present invention generally relates to a wireless mobile communication system, and in particular, to a network entry method in a wireless mobile communication system.

2. Description of the Related Art

Generally, a Mobile Station (MS) has to perform a network entry operation to communicate with a Base Station (BS) in a wireless mobile communication system.

FIG. 1 is a signaling diagram illustrating a network entry procedure between a BS 150 and an MS 100 in a conventional wireless mobile communication system.

Referring to FIG. 1, the MS 100 receives an UpLink-map (UL-MAP) message and a DownLink-map (DL-MAP) message from the BS 150 in step 102 and receives an Uplink Channel Description (UCD) message and a Downlink Channel Description (DCD) message in step 104, thereby acquiring synchronization with the BS 150. The DL-MAP message and the UL-MAP message are usually used in an Orthogonal Frequency Division Multiple Access (OFDMA) communication system or an Institute of Electrical and Electronics Engineers (IEEE) 802.16 communication system, which is a wideband wireless access communication system. Therefore, in the following description, the OFDMA communication system or the IEEE 802.16 communication system will be taken as an example.

The MS 100 sends a ranging code for initial ranging to the BS 150 in step 106. The ranging code is used to adjust link timing and power offset. Upon completion of timing and offset adjustment, the BS 150 sends a ranging response (RNG-RSP) message having a status field marked as 'success' to the MS 100 in step 108.

The MS 100 sends a ranging request (RNG-REQ) message to the BS 150 in step 112. The RNG-REQ message includes a Medium Access Control (MAC) address of the MS 100. The BS 150, having received the RNG-REQ message, allocates a basic Connection Identifier (CID) and a primary CID of the MS 100 based on the MAC address and sends an RNG-RSP message including the basic CID and the primary CID to the MS 100 in step 114.

The MS 100 having received the RNG-RSP message sends a Subscriber Station Basic Capability Negotiation Request (SBC-REQ) message to the BS 150 in step 122. The SBC-REQ message, a MAC message for basic capability negotiation, includes a physical layer parameter and security negotiation support information that can be provided by the MS 100. The BS 150 receives the SBC-REQ message and checks information such as the physical layer parameter and the security negotiation support included in the SBC-REQ message. Then the BS 150 sends a Subscriber Station Basic Capability Negotiation Response (SBC-RSP) message to the MS 100 in response to the SBC-REQ message in step 124.

The MS 100 sends a Privacy Key Management Request (PKM-REQ) message to the BS 150 in step 132. The PKM-REQ message, a MAC message for MS authorization, includes a unique certificate of the MS 100. Upon receiving the PKM-REQ message, the BS 150 performs authorization on the MS 100 with an Authorization Server (AS, not shown) using the unique certificate of the MS 100, included in the PKM-REQ message. The BS 150 sends a Privacy Key Management Response (PKM-RSP) message including the authorization result to the MS 100 in step 134. The PKM-RSP message includes an Authorization Key (AK) and a Traffic Encryption Key (TEK) that are allocated to the MS 100 when the MS 100 is an authorized MS.

The MS 100 having undergone authorization sends a Registration Request (REG-REQ) message to the BS 150 in step 142. The REG-REQ message includes registration information of the MS 100. The BS 150 detects the registration information included in the REG-REQ message, registers the MS 100 therein according to the detection result, and allocates a secondary management CID for the MS 100. The BS 150 sends a Registration Response (REQ-RSP) message including the secondary management CID to the MS 100 in step 144.

Although not shown in FIG. 1, the MS 100 then performs an Internet Protocol (IP) connection and service flow connection procedure with the BS 150.

FIG. 2 illustrates a MAC address format used in a conventional wireless mobile communication system.

Referring to FIG. 2, a MAC address has a 48-bit physical address format. In the MAC address, an upper 24 bits 202 indicate a company ID (or manufacturer ID) administered by the Institute of Electrical and Electronics Engineers (IEEE) standard and a lower 24 bits 204 indicate a serial number or ID assigned to each terminal by a manufacturer.

As discussed above, an MS in a wireless mobile communication system performs various processes with a BS for initial network entry. As a result, a large amount of signaling is generated between the MS and the BS, which causes a delay in the network entry process. Moreover, when a plurality of MSs attempt network entry, a BS experiences heavy load in processing signaling generated by the MSs, increasing the delay in the network entry process.

SUMMARY OF THE INVENTION

An aspect of the present invention is to address at least the above problems and/or disadvantages and to provide at least the advantages described below. Accordingly, an aspect of the present invention is to provide a method to minimize the time required for initial network entry in a wireless mobile communication system.

Another aspect of the present invention is to provide a method for initial network entry to improve the performance of a wireless mobile communication system.

Another aspect of the present invention is to provide a new Medium Access Control (MAC) address format in a wireless mobile communication system.

According to one aspect of the present invention, there is provided an initial network entry method by a Mobile Station (MS) in a wireless mobile communication system. The initial network entry method includes sending a ranging request message including a Medium Access Control (MAC) address in a predetermined format to a Base Station (BS) and receiving a ranging response message including information associated with basic capability negotiation and information associated registration from the BS.

According to another aspect of the present invention, there is provided an initial network entry method by a Base Station (BS) in a wireless mobile communication system. The initial network entry method includes receiving a ranging request message including a Medium Access Control (MAC) address in a predetermined format from a Mobile Station (MS) and sending a ranging response message including information associated with basic capability negotiation and information associated with registration to the MS.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE EXEMPLARY EMBODIMENT

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention.

The present invention provides a new Medium Access Control (MAC) address format and a network entry method that minimizes a delay caused by initial network entry by a Mobile Station (MS) using the MAC address in the new format in a wireless mobile communication system.

Figure 2:
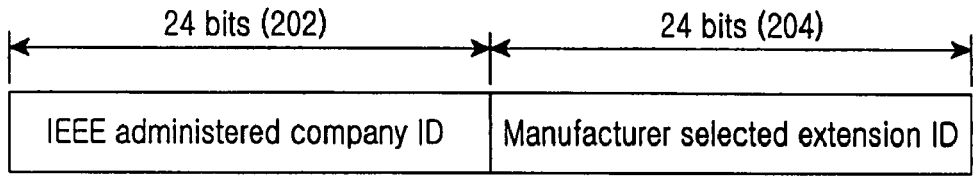
FIG. 2 illustrates a Medium Access Control (MAC) address format used in a conventional wireless mobile communication system.

The present invention can be applied to all types of wireless mobile communication systems using the MAC address format similar to that as shown in FIG. 2, and preferably, to an Institute of Electrical and Electronics Engineers (IEEE) 802.16 communication system and a portable Internet communication system using a band of 2.3 GHz.

Figure 3:
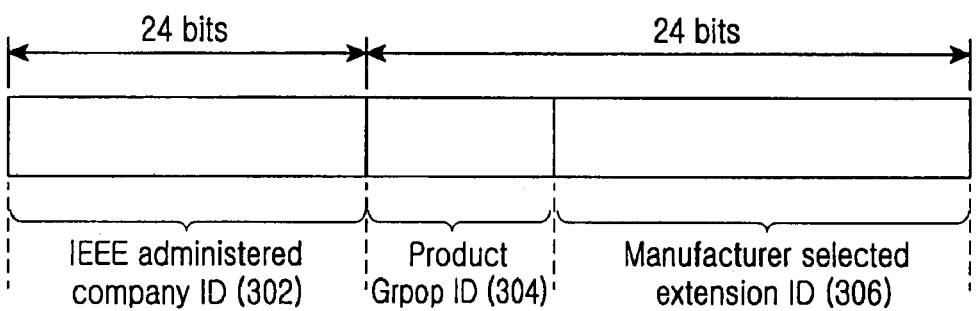
FIG. 3 illustrates a new MAC address format according to the present invention.

FIG. 3 illustrates a new MAC address format according to the present invention.

Referring to FIG. 3, the new MAC address format has a 48-bit physical address format as in a conventional MAC address format. As in a conventional MAC address, the upper 24 bits 302 in a MAC address indicate a company ID (or manufacturer ID). However, the lower 24 bits of the MAC address of the new format are different from those of the conventional MAC address. In other words, some of the lower 24 bits indicate a product group ID 304 and the remaining bits of the lower 24 bits indicate a serial number or ID 306 assigned to each terminal by a manufacturer. Here, the product group ID 304 may be expressed with 8 bits and the other 16 bits may indicate a serial number assigned to each terminal.

For example, if there are a group of 10 products, i.e., terminals, having a model name 'A-10', a product group ID corresponding to the A-10 product group is mapped to the 8 bits of the MAC address and serial numbers of the $1^{st}$ through $10^{th}$ terminals are serially mapped to the 16 bits of the MAC address. By configuring the MAC address in this way, the BS analyzes the upper 24 bits of the MAC address to recognize the manufacturer of the terminal, the 8 bits of the lower 24 bits of the MAC address to recognize a product group ID, and the remaining 16 bits of the lower 24 bits of the MAC address to recognize a serial number of each product included in the product group.

Hereinafter, the rationale for a new MAC address format and the advantages of using the MAC address of the new format will be described with reference to FIG. 1.

When an MS performs an initial network entry with a BS, products, i.e., terminals, included in the same product group, have the same basic functions and the same unique parameters like registration information. However, the BS receiving a MAC address included in a conventional Ranging Request (RNG-REQ) message can know only a manufacturer and a serial number of a product without knowing the type of a product group including the product. As a result, the MS trying initial network entry can be provided with a service from the BS only after Ranging 160, SS Basic Capability Negotiation 170, Authorization & Key Exchange 180, and Registration 190 are completed.

However, in the present invention, by using a MAC address including a product group ID, i.e., the type of a product group, the SS Basic Capability Negotiation 170 and the Registration 190 can be omitted. To this end, the BS has to previously store and manage the product group ID. The product ID may be maintained and managed by the BS after being provided from a manufacturer or storing information of an MS that previously has attempted network entry.

Hereinafter, a process of network entry by a BS according to the present invention will be described with reference to the flowchart of FIG. 4.

Figure 4:
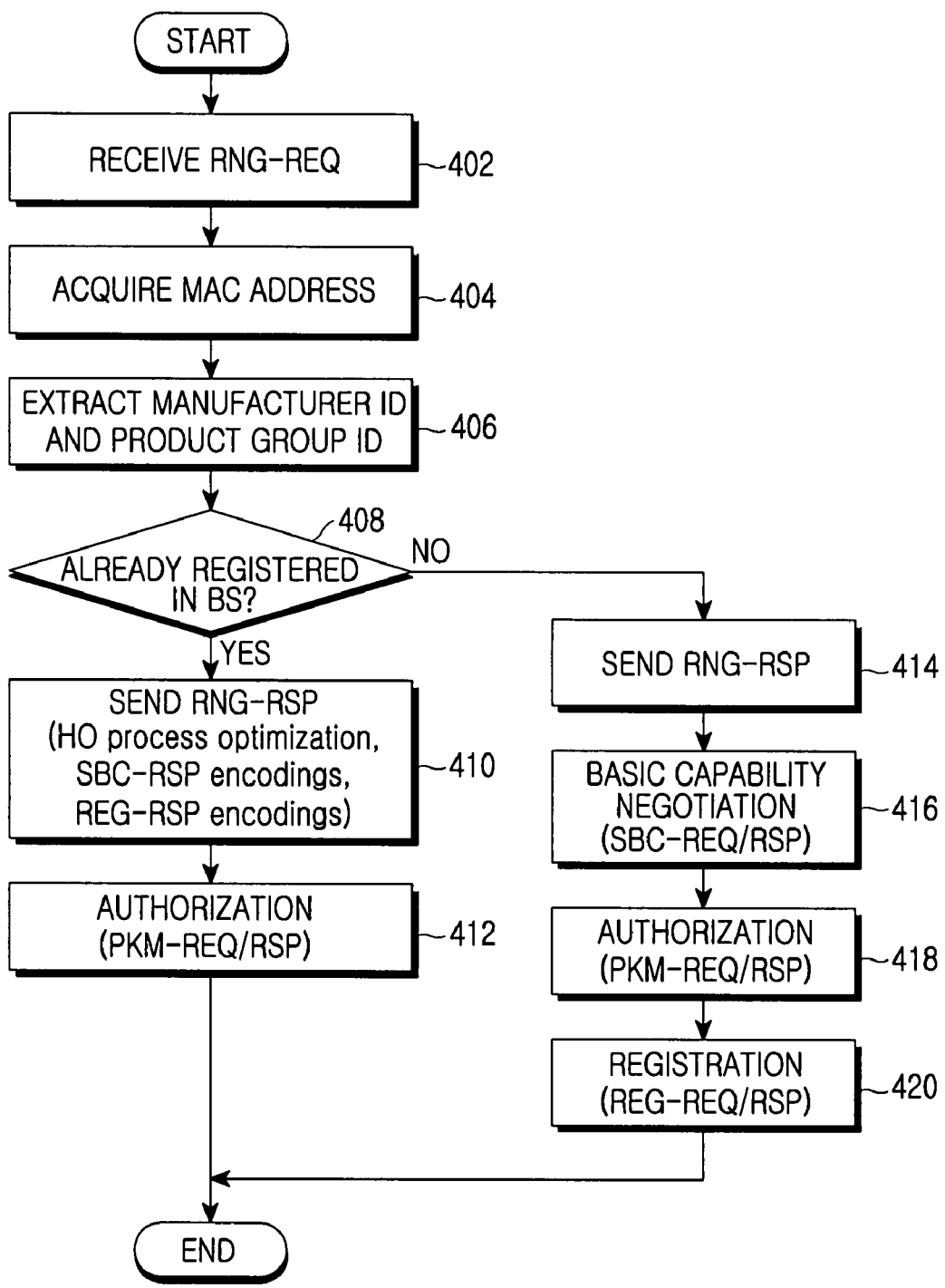
FIG. 4 is a flowchart of a network entry method by a BS according to the present invention.

FIG. 4 is a flowchart of a network entry method by a BS according to an exemplary embodiment of the present invention.

Referring to FIG. 4, the BS receives a RNG-REQ message including a MAC address from an MS in step 402. The MAC address has the new format shown in FIG. 3. In step 404, the BS acquires the MAC address of the MS from the RNG-REQ message. In step 406, the BS extracts a manufacturer ID and a product group ID from the MAC address.

In step 408, the BS determines whether the extracted manufacturer ID and product group ID have been already stored therein. If they have been already stored, the BS goes to step 410. Otherwise, the BS proceeds to step 414.

In step 410, the BS transmits a Ranging Response (RNG-RSP) message to the MS. The RNG-RSP message is different from a conventional RNG-RSP message. The RNG-RSP message according to the present invention includes information associated with HandOver (HO) process optimization, information associated with basic capability negotiation, and information associated with registration. In other words, the RNG-RSP message further includes an HO process optimization field, a Subscriber Station Basic Capability Negotiation Response (SBC-RSP) encodings field, and a Registration Response (REG-RSP) encodings field in a Type/Length/Value (TLV) region. The RNG-RSP message is a ranging message used for initial ranging.

In step 412, the BS performs authorization on the MS and terminates the network entry process.

Figure 1:
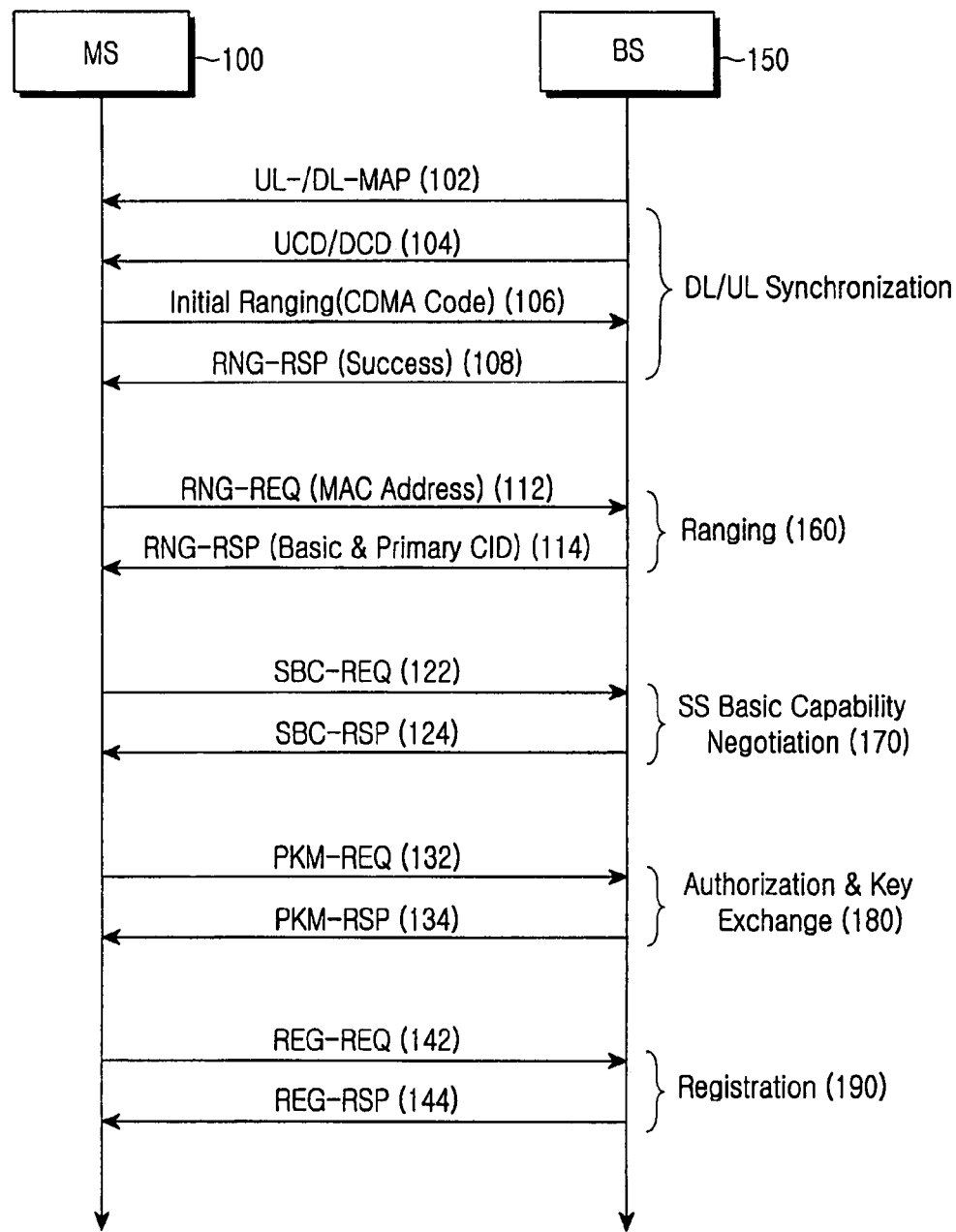
FIG. 1 is a signaling diagram illustrating a network entry procedure between a Base Station (BS) and a Mobile Station (MS) in a conventional wireless mobile communication system.

Steps 414 through 420 correspond to the Ranging 160, the SS Basic Capability Negotiation 170, the Authorization & Key Exchange 180, and the Registration 190 of the conventional network entry process shown in FIG. 1 and thus will not be described.

Figure 5:
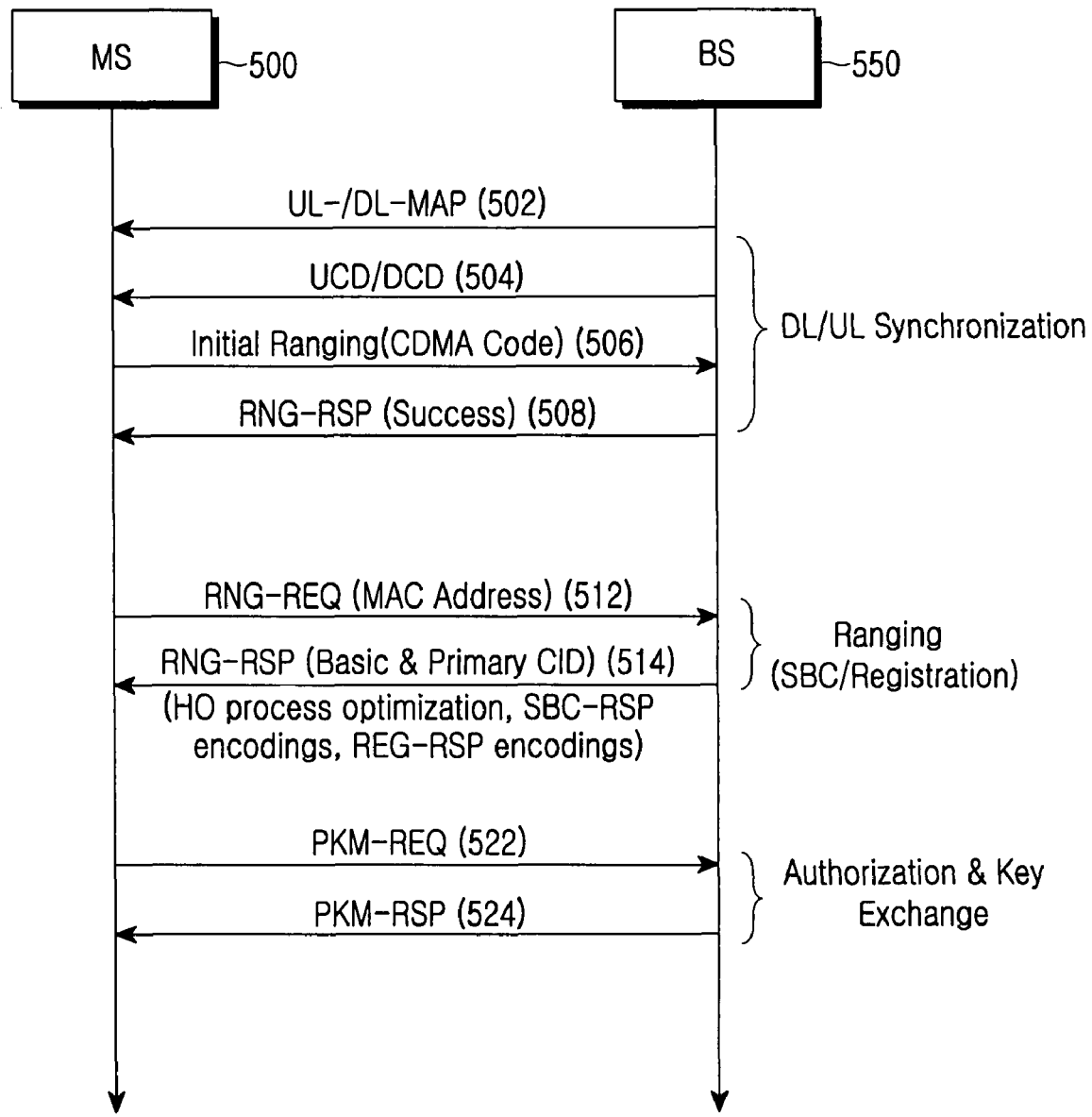
FIG. 5 is a signaling diagram illustrating a network entry procedure between a BS and an MS in a wireless mobile communication system according to the present invention.

FIG. 5 is a signaling diagram illustrating a network entry procedure between a BS 550 and an MS 500 in a wireless mobile communication system according to the present invention.

Referring to FIG. 5, the MS 500 receives an UpLink-map (UP-MAP) message and a DownLink-map (DL-MAP) message from the BS 550 in step 502 and an Uplink Channel Description (UCD) message and a Downlink Channel Description (DCD) message from the BS 550 in step 504, thereby acquiring uplink synchronization and downlink synchronization with the BS 550.

The MS 500 sends a ranging code for initial ranging to the BS 550 in step 506. The ranging code is used to adjust link timing and power offset. After completion of timing and offset adjustment, the BS 550 sends an RNG-RSP message having a status field marked as 'success' to the MS 500 in step 508.

The MS 500 sends an RNG-REQ message to the BS 550 in step 512. The RNG-REQ message includes a MAC address of the MS 500. Upon receiving the RNG-REQ message, the BS 550 allocates a basic Connection Identifier (CID) and a primary CID for the MS 500 and sends an RNG-RSP message including the allocated basic CID and primary CID to the MS 500 in step 514. The BS 550 performs basic capability negotiation and registration processing with the MS 500 by referring to its previously stored product group ID and sends the processing result to the MS 500 through the RNG-RSP message. Thus, the RNG-RSP message includes an HO process optimization field, a SBC-RSP encodings field, and an REG-RSP encodings field. The HO process optimization field is required so that the MS 500 does not have to perform basic capability negotiation and registration and thus, the BS 500 sets an $8^{th}$ bit and a $9^{th}$ bit of the HO process optimization field to '1' before sending the RNG-RSP message. However, if the BS 550 has not previously stored the product group ID of the MS 500, it performs the conventional network entry process shown in FIG. 1.

Upon receiving the RNG-RSP message, the MS 500 sends a Privacy Key Management Request (PKM-REQ) message to the BS 550 in step 522. The PKM-REQ message, a MAC message for authorization of the MS 500, includes a unique certificate of the MS 500. The BS 550, having received the PKM-REQ message, performs authorization on the MS 500 with an Authorization Server (AS, not shown) using the unique certificate of the MS 500, included in the PKM-REQ message. The BS 550 sends a Privacy Key Management Response (PKM-RSP) message including the authorization result to the MS 500 in step 524. The PKM-RSP message includes an Authorization Key (AK) and a Traffic Encryption Key (TEK) that are allocated to the MS 500 when the MS 500 is an authorized MS.

Although not shown in FIG. 5, the MS 500 then performs an Internet Protocol (IP) connection and service flow connection procedure with the BS 550.

As described above, according to the present invention, an MS trying initial network entry in a wireless mobile communication system can skip message transmission/reception for separate basic capability negotiation and registration by completing basic capability negotiation and registration during a ranging process. Subsequently, the MS can minimize a delay caused by initial network entry and a BS can reduce signaling overhead even when a plurality of MSs attempt initial network entry.

While the invention has been shown and described with reference to an exemplary embodiment thereof, it will be understood by those skilled in the art that various changes in form and details may be made therein without departing from the spirit and scope of the invention.

What is claimed is:

1. An initial network entry method by a Mobile Station (MS) in a wireless mobile communication system, the initial network entry method comprising:
   transmitting a ranging request message including a Medium Access Control (MAC) address including a product group IDentifier (ID) indicating a specific product group to which the MS corresponds in a predetermined format to a Base Station (BS); and
   receiving a ranging response message including information associated with basic capability negotiation and information associated with registration, corresponding to the product group ID, from the BS,
   wherein the information associated with basic capability negotiation and the information associated with registration are determined by the BS storing product group IDs of MSs previously performing a network entry, and information associated with basic capability negotiation and information associated with registration corresponding to each of the MSs, and
   wherein the MAC address includes 24 bits representing a manufacturer ID of the MS, 8 bits representing the product group ID, and 16 bits representing a serial number assigned to the MS by a manufacturer.

2. The initial network entry method of claim 1, further comprising performing authorization with the BS after the reception of the ranging response message.

3. The initial network entry method of claim 1, wherein the ranging response message includes a Hand-Over (HO) process optimization field in the form of a Type/Length/Value (TLV) field.

4. The initial network entry method of claim 3, wherein an $8^{th}$ bit and a $9^{th}$ bit of the HO process optimization field are set to a value indicating that basic capability negotiation and registration can be omitted.

5. The initial network entry method of claim 1, wherein the information associated with basic capability negotiation and the information associated with registration, which are received from the BS, include a Subscriber Station Basic Capability Negotiation Response (SBC-RSP) encodings field and a Registration Response (REG-RSP) encodings field.

6. An initial network entry method by a Base Station (BS) in a wireless mobile communication system, the initial network entry method comprising:
   previously storing product group identifiers of a plurality of Mobile Stations (MSs), and information associated with basic capability negotiation and information associated with registration corresponding each of the MSs;
   receiving a ranging request message including a Medium Access Control (MAC) address including a first product group IDentifier (ID) indicating a specific product group to which a first Mobile Station (MS) corresponds, in a predetermined format from the first MS;
   determining whether the first product group ID is stored; and
   if the first product group ID is stored, transmitting a ranging response message including information associated with basic capability negotiation and information associated with registration corresponding to the first product group ID to the first MS,
   wherein the MAC address includes 24 bits representing a manufacturer ID of the first MS, 8 bits representing the first product group ID, and 16 bits representing a serial number assigned to the first MS by a manufacturer, and wherein previously storing the group identifiers comprises storing a second product group ID of a second MS, and information associated with basic capability negotiation and information associated with registration corresponding to the second product group ID of the second MS, when the second MS performs a network entry.

7. The initial network entry method of claim 6, further comprising performing authorization on the first MS after transmitting the ranging response message.

8. The initial network entry method of claim 6, wherein the ranging response message includes a Hand-Over (HO) process optimization field in the form of a Type/Length/Value (TLV) field.

9. The initial network entry method of claim 8, wherein an $8^{th}$ bit and a $9^{th}$ bit of the HO process optimization field are set to a value indicating that basic capability negotiation and registration can be omitted.

10. The initial network entry method of claim 6, wherein the information associated with basic capability negotiation and the information associated with registration, which are transmitted to the first MS, include a Subscriber Station Basic Capability Negotiation Response (SBC-RSP) encodings field and a Registration Response (REG-RSP) encodings field.

* * * * *